United States Patent [19]

DiCecio

[11] 4,224,597

[45] Sep. 23, 1980

[54] SYSTEM FOR DETECTING UNDERINFLATED TIRE IN A ROLLING VEHICLE

[75] Inventor: Salvatore A. DiCecio, Irving, Tex.

[73] Assignee: Avmar, Incorporated, Ronkonkoma, N.Y.

[21] Appl. No.: 955,361

[22] Filed: Oct. 27, 1978

[51] Int. Cl.² .................. B06C 23/00; G08G 1/12
[52] U.S. Cl. ........................... 340/58; 73/65; 73/146; 340/27 R
[58] Field of Search ............. 340/58, 52 R, 52 B, 340/27 R; 73/146, 65; 180/100; 280/1.12, 112 A; 244/100 R, 102 A, 104 R, 111; 116/34 R

[56] References Cited

U.S. PATENT DOCUMENTS

| | | | |
|---|---|---|---|
| 3,691,524 | 9/1972 | Frost et al. | 340/58 |
| 3,900,828 | 8/1975 | Lage et al. | 340/58 |
| 4,009,914 | 3/1977 | Sato et al. | 340/52 B |
| 4,061,402 | 12/1977 | Peterson et al. | 340/52 B |

Primary Examiner—Thomas A. Robinson

Attorney, Agent, or Firm—Peter J. Murphy

[57] ABSTRACT

The speeds of two wheels are detected by means of wheel speed transducers associated with each wheel, each producing a DC voltage signal proportional to the respective wheel speed. The circuit includes two electric comparators, each having two inputs and one output, each output controlling a fault indicator in the form of an incandescent light. The two inputs for each comparator are the two produced DC voltage signals; and each comparator is identified with one transducer which provides a triggering wheel speed signal, with the other transducer providing a reference wheel speed signal. Sensitivity resistors provide a positive bias on the reference signal input to each comparator. Normally the two wheel speed signals are the same; however, when a triggering wheel speed signal increases a selected amount relative to the reference wheel speed signal, responsive to an underinflated tire, the associated comparator switches to activate the fault light to indicate an underinflated tire.

21 Claims, 4 Drawing Figures

SYSTEM FOR DETECTING UNDERINFLATED TIRE IN A ROLLING VEHICLE

BACKGROUND AND SUMMARY OF THE INVENTION

This invention relates particularly to a system for detecting an underinflated tire of a vehicle; and more generally to a system for detecting a difference in the rolling speed of one vehicle wheel relative to another, which may be an indication of underinflation.

Underinflated tires on any vehicle are a potential hazard, particularly so with respect to an aircraft wherein the loss of full support of one wheel of a landing gear may result in serious damage and, possibly, loss of control of the aircraft.

The undercarriages of modern high capacity aircraft must be capable of withstanding enormous loadings and shocks, and very high landing and takeoff speeds without significant hazards to the craft occupants and cargo. Such undercarriages may fail to perform as intended, if any one of the tires happens to be flat or even underinflated. The serious nature of such problems can be readily appreciated when it is realized that one flat or inadequately inflated tire of a multiple set may not be easily discerned on casual visual inspection and yet may be grossly damaged, may cause other tires of the set to be overloaded and damaged, or may overheat to the point of inflammability as a consequence of high speed runway travel of the craft.

Separate tire pressure readings cannot be taken easily and economically from outside by a ground maintenance crew each time a many-wheeled aircraft prepares for takeoff. Equipment which routinely comes to mind for automatic sensing of rotatable-wheel tire pressures may be expected to involve elaborate and undesirably weighty provisions for telemetering.

It is desirable, however, to provide a system, particularly for use with aircraft, which will advise the operators of the aircraft of an underinflated tire while the aircraft is rolling on the ground. In addition to the safety factor provided by such a system, the system enables repair or replacement of the offending tire with a minimum of delay and resultant saving of costly aircraft time.

The detection of an underinflated tire is based on the detection of an increase in speed of the wheel carrying that underinflated tire, considering that when the tire is underinflated it will have a smaller rolling radius and will therefore rotate faster than a wheel with a normally inflated tire. In the following specification the term "rolling radius" means the distance between the wheel support surface and the wheel axis of rotation. The term "rolling circumference" is the effective tire circumference related to the rolling radius. The detection system must be quite sensitive considering that most modern high capacity aircraft are equipped with landing gear structures which involve a multiplicity of inflated tires arranged in sets or "bogies" associated with different ones of several main struts, and these sets include side-by-side pairs of tires. The difference in rolling radius of the underinflated tire then will be affected by the fact that a substantial portion of the load is carried by the adjacent tire.

An object of this invention is to provide a system for detecting a difference in the speed of rotation of one wheel relative to another, in a rolling vehicle such as an aircraft.

Another object of this invention is to provide a system for detecting an underinflated tire in a rolling vehicle, such as an aircraft.

A further object of this invention is to provide a system for detecting an underinflated tire in a rolling vehicle, by comparing the speed of rotation of two different vehicle wheels.

Still another object of this invention is to provide a system for detecting an underinflated tire in a rolling vehicle, which system is economic to manufacture, reliable in operation, and responsive to very small changes in tire inflation pressure.

Another object of this invention is to provide a system for detecting a dragging brake in a rolling vehicle.

A still further object of this invention is to provide a system for detecting a change in rotational speed of one wheel relative to another, in a rolling vehicle such as an aircraft, which system is responsive to a very small increase in the speed of one wheel relative to the other resulting from loss of pressure in the one wheel tire.

These objects are attained in an advisory system for detecting and indicating a difference in speed of a pair of load bearing wheels of a vehicle. Broadly the system includes first and second signal generating means associated, respectively, with first and second wheels. Each signal generating means includes wheel speed transducer means coupled to a wheel for producing a DC voltage wheel speed signal which is proportional in linear relation to the rotational speed of the wheel. An electric comparator means produces an output signal responsive to differences between two input signals applied thereto; and an electrically operated fault signaling means is responsive to an output signal from the comparator means. The system includes means applying as input signals to said comparator means, a first wheel speed signal related to the first signal generating means, and a second wheel speed signal related to the second signal generating means. The comparator means produces an output signal to activate the fault signaling means when one of said wheel speed signals changes in relation to the other, with the other wheel speed signal functioning as a reference signal.

More particularly the electric comparator means includes first and second separate comparator means; and the fault signaling means is responsive to an output signal from either of said comparator means. The input signals applied to the first comparator are the first and second wheel speed signals, with the second wheel speed signal functioning as the reference signal; generating means; the first comparator means producing an output signal to activate the fault signaling means when the first wheel speed signal changes in relation to the reference signal. The input signals applied to the second comparator means are the first and second wheel speed signals with the first wheel speed signal functioning as the reference signal; and the second comparator means produces an output signal to activate the fault signaling means when the second wheel speed signal changes in relation to the reference signal.

The novel features and the advantages of the invention, as well as additional objects thereof, will be understood more fully from the following description when read in connection with the accompanying drawing.

DRAWING

DESCRIPTION OF THE PREFERRED EMBODIMENT

The described system, including wheel speed transducers and an associated detection circuit, is designed for two wheel speed transducers mounted in association with two wheels of the vehicle. The circuit includes a single fault indicator, in the form of an incandescent bulb, which responds to a difference in the signals produced by the two transducers. This described circuit may be used then with an aircraft in which the main gear consists of single left and right wheels, or in which the main gear consists of bogies carrying multiple wheels.

Figure 1:
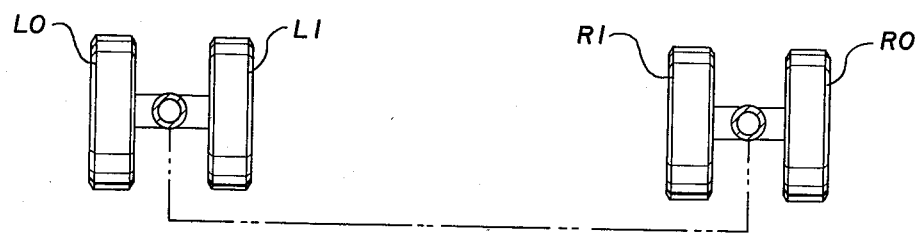
FIG. 1 is a diagrammatic illustration of the main landing gear of an aircraft, which consists of four wheels.

For an aircraft having only two wheels, a single system according to the invention would be employed. FIG. 1 of the drawing illustrates the main gear of an aircraft having four wheels carried on left and right bogies, the wheels being designated by appropriate abbreviations for: left outboard, left inboard, right inboard, and right outboard. For such aircraft two systems would be employed, one system being associated with the wheels LO and RO, and another system being associated with the wheels LI and RI. With this arrangement the systems will be more sensitive. Were the system connected to the wheels LO and LI, for example, the system would require greater sensitivity for the reason that, should the wheel LO become underinflated, the wheel LI will assume a greater portion of the load and its rolling radius will therefore reduce resulting in a lesser difference between the rolling radii of the wheels LO and LI.

Figure 2:
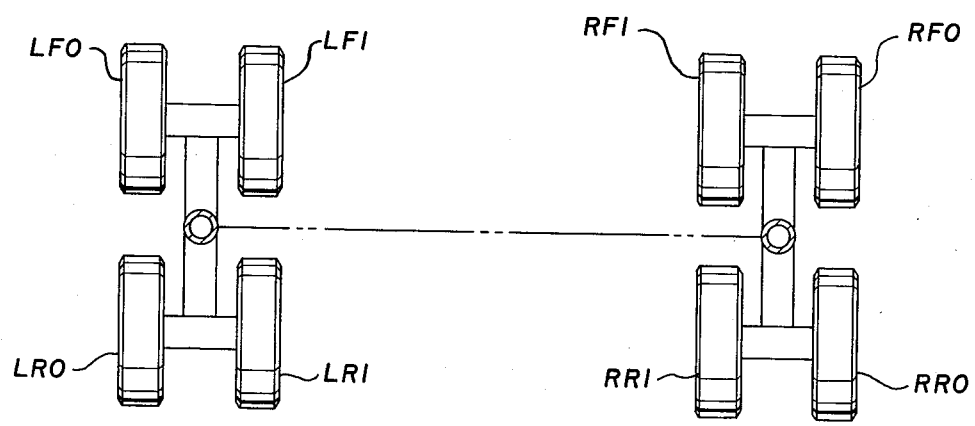
FIG. 2 is a diagrammatic illustration of the main landing gear of an aircraft, which consists of eight wheels.
Figure 3A:
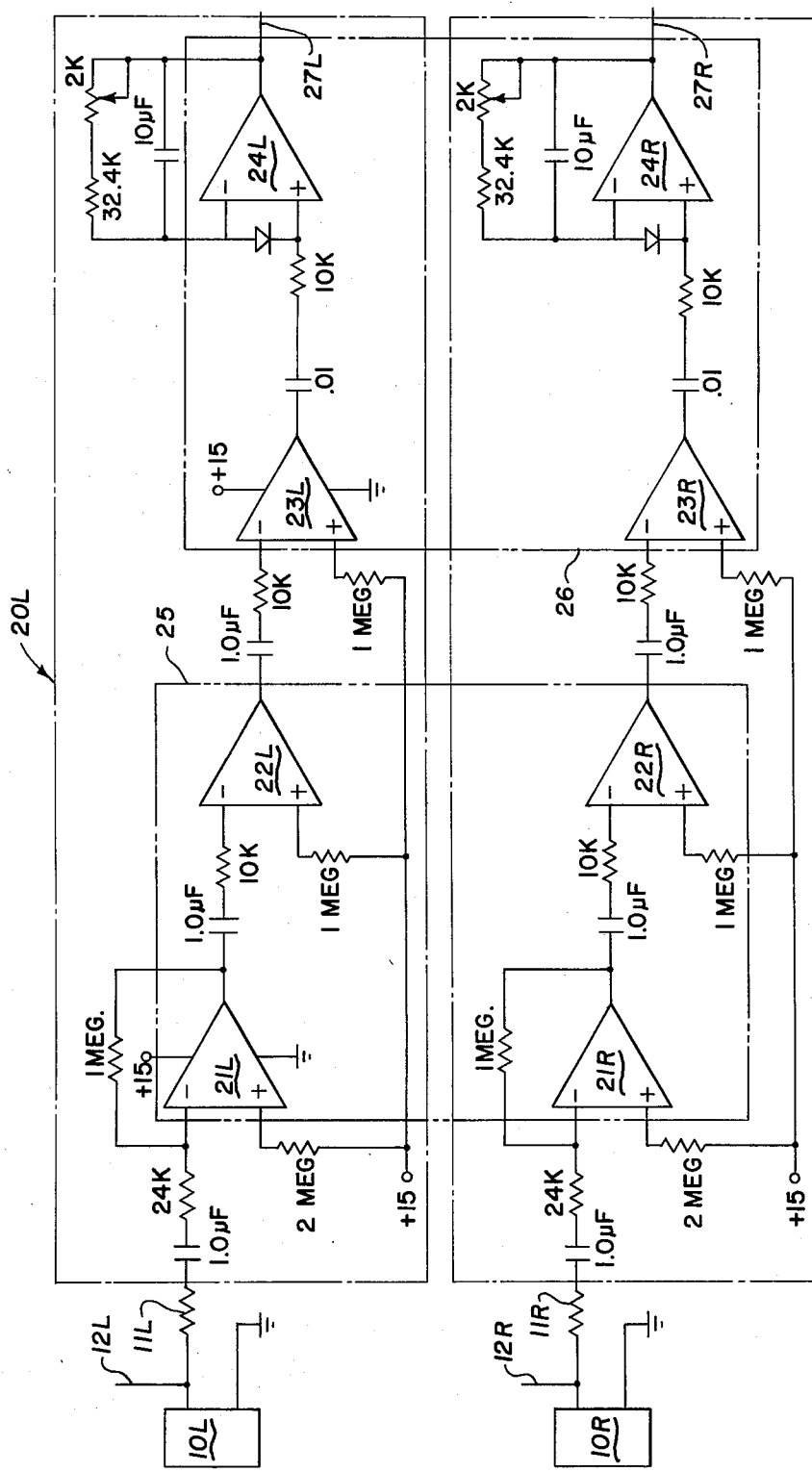
FIGS. 3a and 3b are a schematic drawing of a system circuit.
Figure 3B:
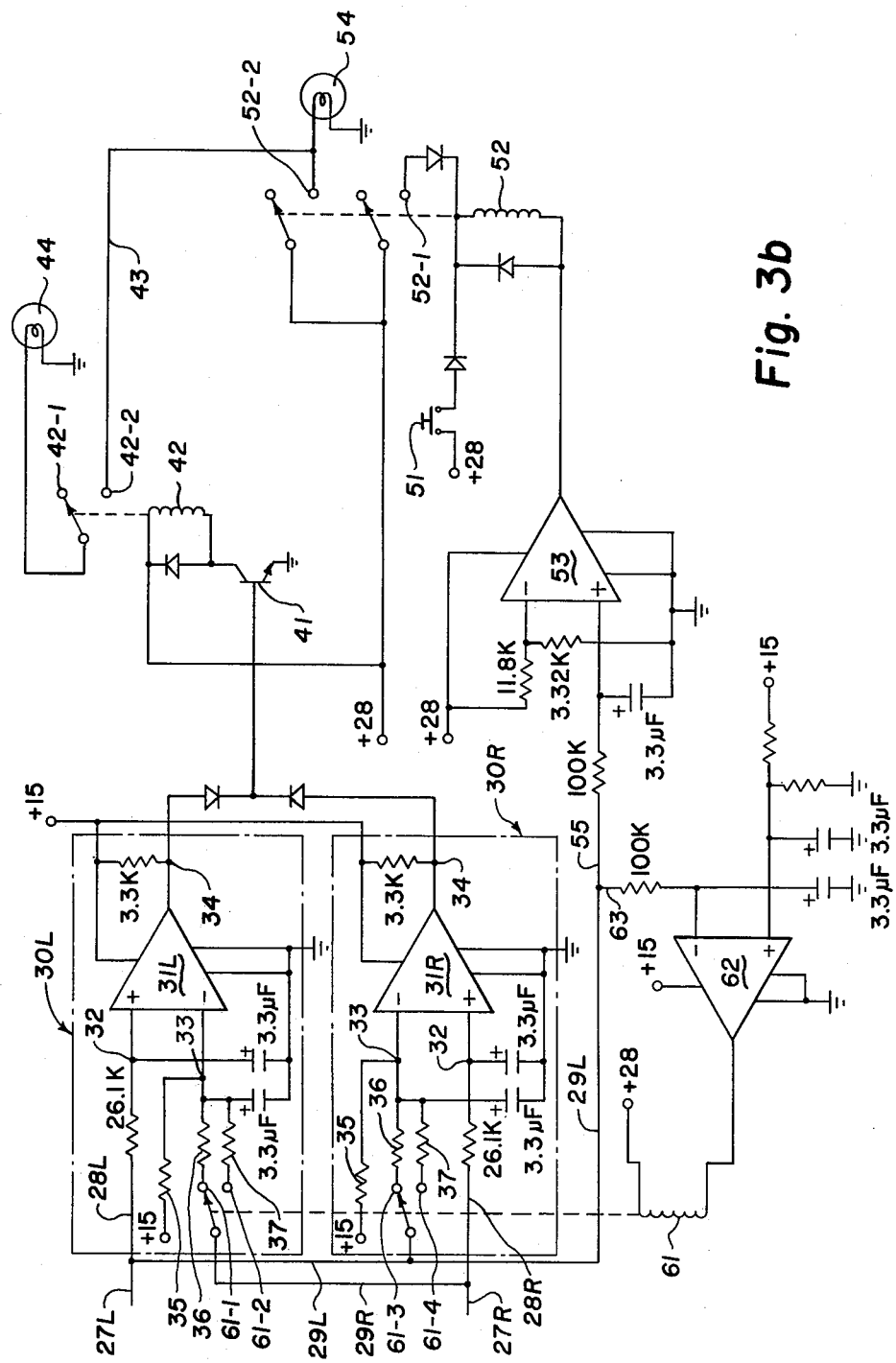

FIG. 2 of the drawing illustrates the main landing gear of an aircraft having eight wheels carried on left and right bogies; and the wheels are designated by appropriate abbreviations for: left front outboard, left front inboard, left rear outboard, left rear inboard, right front inboard, right front outboard, right rear inboard and right rear outboard. For this aircraft, preferably four systems would be employed, with each system associated with diagonally opposite wheels on respective bogies. That is, four systems would be associated respectively with the following wheel combinations: (1) LFO and LRI, (2) LRO and LFI, (3) RFI and RRO, (4) RRI and RFO. With this arrangement the differences in rolling radius between an underinflated wheel and its coupled wheel will be emphasized. For example, should the wheel LRO be underinflated, due to a pivoting effect of the bogey about the wheels LFO and LRI, the change in the rolling radius of the wheel LFI will be smaller and the radius may possibly even increase. The system then will be more sensitive; that is, it will respond to a lesser pressure loss then would be the case, for example, for a system associated with the four wheel aircraft illustrated in FIG. 1, or where the system is coupled to side-by-side wheels of the four wheel bogey such as the wheels LFO and LFI.

For the systems referred to above, the single fault light will not identify which wheel is the faulty or underinflated wheel. By the same token, where the aircraft includes two or four systems as above discussed, all systems could be coupled to a common fault light and the fault light would then indicate only that one of the wheels was faulty without identifying the faulty wheel. Such an overall system may be desirable to the extent that a fault signal would initiate a maintenance check of all of the aircraft wheels for improved safety. Alternatively, the circuitry could be modified to provide a separate fault light associated with the output of each comparator; and the energization of a particular fault light would then identify which of the aircraft wheels is the faulty wheel.

Since the system of the invention is directed to detecting a difference in speed of one wheel relative to another, it will function as a detector of any type of fault which would produce that difference. In the case of an underinflated tire, as discussed above, the underinflated tire will increase in speed relative to the normally inflated tire. Another fault situation would be that of a dragging brake or locked up wheel. In this case the faulty wheel would be rotating slower than the reference wheel which would be rotating at the normal speed. The following description is concerned with the principal problem of detecting underinflated.

In the system to be described, the two signals being compared are "wheel speed signals" originating in respective different wheels; and these wheel speed signals are identical at normal tire infation. In order to detect a difference of selected magnitude between these wheel speed signals, the voltage signals are applied as the positive and negative inputs to two independent comparators. For each comparator, a positive sensitivity bias voltage of selected magnitude is provided at the negative input, so that the comparator will not be triggered to high output until the wheel speed signal fed to the comparator positive input exceeds the wheel speed signal fed to the comparator negative input by the magnitude of the bias voltage. When underinflation occurs, the wheel speed signal for the underinflated wheel, applied to the comparator positive input, functions as the "triggering signal"; and the normal wheel speed signal, applied to the comparator negative input, functions as a "reference signal". The above mentioned two wheel speed signals are cross-connected to the two above mentioned independent comparators. Therefore, the wheel speed signal for one wheel becomes the triggering signal for one of the comparators in the event of underinflation of that wheel; and by the same token the wheel speed signal for the other wheel becomes a triggering signal for the other comparator in the event of underinflation of that other wheel. Accordingly, the system, including the two comparators, will detect and indicate the underinflation of either of the two wheels. In the following specification, the term "reference signal" is understood to mean the above described reference wheel speed signal, which is then increased by the sensitivity bias to become the negative input of a comparator. The described sensitivity bias determines the "sensitivity" of the circuit.

As an example of the sensitivity required for a system of this type, consider a tire for a typical commercial aircraft which has an effective rolling radius of 20.2 inches at 180 psi with the aircraft loaded. Consider further that this tire is side-by-side with a similar tire.

The reduction of the rolling radius for selected inflation pressures are as follows:

| Tire Pressure (psi) | Radius Change (In.) | Rolling Radius (In.) |
|---|---|---|
| 180 | — | 20.20 |
| 150 | .15 | 20.05 |
| 125 | .32 | 19.88 |
| 90 | .56 | 19.64 |

Assuming that a 50% pressure loss in one tire, that is a reduction from about 180 psi to 90 psi, is a condition which is dangerous or at least possibly damaging to the aircraft tires and undercarriage, the system should be designed to detect that 50% pressure reduction at a reasonably low taxiing speed. For the tire discussed above it will be seen that this 50% pressure loss produces a reduction in rolling radius of slightly more than one-half inch. From tests conducted by applicant, he has concluded that a practical system should detect that change in rolling radius when the aircraft reaches a taxiing ground speed of 18 knots.

For the aircraft and system described here by way of example, wheel speed transducers are already installed in each of the aircraft wheels (for use with an anti-skid brake system), which produced frequency output signals of 400 cps at 50 knots ground speed; and accordingly this frequency signal changes at the rate of 8 cps for each one knot change in speed.

The applicant's system is based on the detecting of a 4 cps difference in the output signals between a fully inflated wheel and a 50% underinflated wheel; and has determined that, for the above mentioned approximately one-half inch difference in rolling radius between the fully inflated wheel and the 50% underinflated wheel, the difference in the output signals will be 4 cps at approximately 18 knots ground speed. For utilizing the transducer outputs in the system circuit, applicant's circuit converts the frequency signals to direct current voltage signals in the ratio: 400 cps=4000 mv (millivolts), 4 cps=40 mv. The circuitry which converts the frequency signal to a voltage signal must be very linear in the range of 100 cps to 400 cps, for example, which is the equivalent of 12.5 knots to 50 knots, and which is converted then to a voltage signal from 1250 mv to 4000 mv. At one selected sensitivity, to be described, the system will detect a 40 mv difference (½ inch difference in rolling radius) between a compared fully inflated wheel and a 50% underinflated wheel at 18 knots.

It is to be recognized that at higher ground speeds, the detected 40 mv difference signal will reflect a lesser percent of underinflation. The effect and use of this will be disclosed subsequently.

Referring to the operation and use of the system in general, the control panel in the aircraft cabin would include one or more fault indicators in the form of incandescent lights for example and one or more "system active indicators" in the form of incandescent lights for example. In simplest form, a single fault light for the entire aircraft would indicate that one wheel is underinflated, and precipitate an inflation check of all of the aircraft wheels.

Referring now to the drawing, the described system is for use with two wheels of an aircraft which, for reference purposes, are referred to as left and right wheels and for which certain components of the system will be identified by subscripts L and R to identify association with such left and right wheels respectively.

The basic input devices are wheel speed transducers 10L and 10R for producing an AC voltage signal, which is proportional to the respective wheel rpm. An example of such transducers is the Hytrol Wheel Speed Transducer, Part No. 40–581, manufactured by the Hydro-Aire Division of Crane Company, Burbank, Calif. This transducer includes an electrically energized magnetic circuit which generates a sinuous voltage at the rate of 50 cycles per wheel revolution, and is the type of component frequently employed with anti-skid braking systems found on many commercial and military aircraft. The output from this transducer is approximately 200 to 400 mv. The transducers 10L and 10R are the inputs for respective amplifier channels 20L and 20R; and are coupled to these amplifier channels by isolating resistors 11L and 11R. The isolating resistors isolate the inflation detector circuit from the inputs 12L and 12R to another system circuit which may be the aircraft anti-skid system for example. This assures that the operation of such anti-skid system will not be affected adversely by any malfunction of the inflation detection system, such as a short circuit.

The amplifier channels 20L and 20R are identical; and the counterpart components are identified by respective subscripts L and R. Amplifier channel 20L includes four stages namely: a preamplifier 21L, a squarer 22L, a squarer and differentiator 23L, and an integrator 24L which is the output stage. This amplifier channel functions to convert the sinuous input from the transducer 10L to a square wave, and includes an integrating circuit to produce a DC output voltage signal which is proportional to the transducer output and therefore to the wheel rpm.

In a particular preferred embodiment of the circuitry the amplifier channels utilize integrated circuit components 25 and 26 which are LM 1900 Quad amplifiers. These components bridge the two amplifier channels in a manner that the integrated circuit 25 is utilized for the preamplifier stages 21L and 21R and squarer stages 22L and 22R of the respective channels. Similarly the integrated circuit 26 is employed for the amplification stages 23L, 24L, 23R and 24R. Utilizing the integrated circuit components in this manner assures that the outputs of the two amplifier channels will track each other very closely with respect to drift due to temperature change. This is important to the system since the different signal to be detected from the outputs of the two amplifier channels is very small.

The outputs of the two amplifier channels 20L and 20R are fed to two comparator circuits 30L and 30R, each of which includes an LM 111H voltage comparator 31 and associated circuitry. Each comparator 31 has associated input points 32 and 33, and an output point 34. The respective input points 33 are maintained positive relative to the respective input points 32 to maintain a normal low output (ground) at point 34. When the input point 32 goes positive relative to the input point 33, the output point 34 goes positive to effect illumination of the fault light. The circuitry for the comparator circuits 30L and 30R, and associated control circuitry, will now be described in detail.

The output of amplifier channel 20L is fed to the input point 32 of comparator 31L through conductors 27L and 28L, and to the input point 33 of comparator 31R through conductors 27L and 29L. Similarly the output of amplifier channel 20R is fed to the input point 32 of comparator 31R through conductors 27R and 28R, and to input point 33 of comparator 31L through conductors 27R and 29R.

Referring now to the comparator circuit 30L and its associated comparator 31L the input point 33 is maintained positive relative to the input point 32, by about 36 mv. This positive bias is produced by the flow of a constant current from the point 33 through the 26.1K resistor 36; the constant current being supplied from a 15 volt source through the 10 megohm resistor 35. With this 36 mv bias, when the output from amplifier channel 20L is about 40 mv higher than the output from amplifier channel 20R, input point 32 will go positive relative to input point 33; and the comparator output point 34 will go high. Comparator circuit 30L, then, functions to produce an output signal when the output from the left wheel transducer 10L exceeds the output from the right wheel transducer 10R by four cycles. For the reverse situation, where the output from transducer 10R is four cycles higher, the comparator circuit 31R is operative; and its input point 32 will go positive relative to the input point 33 to produce a high output at its output point 34. When the output of either comparator 31L or 31R is positive, transistor 41 is caused to conduct; and this energizes the coil of relay 42 causing its associated contact arm to move from contact 42-1 to contact 42-2. When this occurs the fault light 44 will be energized, provided that positive voltage to the fault light is supplied through the conductor 43.

To provide positive voltage for the fault light at contact 42-2, which may be referred to as the "system active" condition, a momentary-on switch 51 is closed to energize the coil of relay 52, current flowing toward the output of comparator 53 which is low (ground). Energization of relay 52 moves its lower contact arm to make contact 52-1 to supply positive voltage to the relay through this contact, and the relay is then self-holding. The upper contact arm makes contact 52-2; and this positive voltage to turn-on lamp 54 which, when illuminated, indicates the "system active" condition. Simultaneously positive voltage is applied through conductor 43 to the contact point 42-2, so that the fault light 44 is conditioned to be energized when the relay coil 42 is energized. The comparator 53 is provided to deenergize relay 52 at a preselected cutoff point such as a taxiing speed of 50 knots. It will be seen that the output of the amplifier channel 20L is coupled to one input of the comparator 53 through conductors 27L, 29L and 55; and the circuitry associated with comparator 53 produces a 28 v comparator output when the input signal from the amplifier channel 20L is the equivalent of a 50 knot ground speed for example. When this occurs 28 volts is applied to both sides of the relay coil 52, causing the relay to drop out and therefore removing the voltage source for both the turn-on lamp 54 and the fault lamp 44. This circuitry is provided to, in effect, deactivate the system when the aircraft speed exceeds 50 knots, on the assumption that fault indications above that speed would be irrelevant and to eliminate distraction of the pilots.

As has been mentioned, since the fault detection system responds to a difference of 40 mv or 4 cps, as the aircraft accelerates the system will be responsive to lesser percentages of underinflation. The described system will indicate a fault for a 90 psi tire (50% underinflated) at about 18 knots. Where the tire is at 125 psi, a fault will be indicated at about 30 knots; and where the tire is at 150 psi a fault will be indicated at about 40 knots, with the above described sensitivity.

Should the operators of the aircraft not be interested in faults for the lesser degrees of underinflation, namely 150 psi and 125 psi, a system may be provided to prevent fault indications at these higher pressures, coupled with the above described 50 knot "deactivate" circuit. This system consists of a sensitivity change relay 61 having a coil connected between a 28 volt source and the output of a comparator 62 which is normally high (28 v). In the normal condition of relay 61, its contact arms make the contacts 61-1 and 61-3 which couple the outputs of the amplifier channels to the respective comparator circuits 30L and 30R through the higher sensitivity resistors 36. When the relay 61 is energized, the arms make contacts 61-2 and 61-4 to couple the amplifier channels to the respective comparators through 52.2 K resistors 37. The effect of this is to double the positive bias applied to the input points 33 for the respective comparators, so that an approximately 80 mv signal (8 cycle signal) is required to shift the comparator outputs to activate the fault light 44. With this decreased sensitivity level for the comparators 31L and 31R, the necessary signals to trigger the comparators for underinflation pressures of 125 psi and 150 psi will not be reached prior to the system inactive cutoff produced at 50 knots by the comparator 53. To energize the relay coil 61, the circuitry associated with the comparator 62 provides an input from the amplifier channel 20L through conductors 27L, 29L and 63. The bias provided at the other comparator input is such that when the millivolt signal level produced by the amplifier channel 20L is equivalent to a 28 knot ground speed for example, the output of comparator 62 will go low (ground) to energize the relay.

What has been described is a very simple and effective system for detecting various degrees of underinflation of tires in an aircraft, or possibly another type of vehicle. The system is effective to detect a very small difference in the rotational speed of two compared wheels; and will therefore detect a relative speed increase resulting from an underinflated tire, and will inherently detect a relative speed decrease resulting from a dragging brake or any other condition.

A feature of the system is that it can be made very sensitive to detect a minimum significant percentage of tire deflation at a relatively low taxiing speed. Inherently the system will detect lesser percentages of inflation at higher taxiing speeds.

Another feature of the system is that it is automatically deactivated when the aircraft ground speed reaches a selected limit, where the fault indication would no longer serve a useful purpose in the judgement of the operators. The system is then deactivated to prevent fault signals and prevent distraction of the pilots or vehicle operators.

Still another feature of the system is that the sensitivity can be made to shift automatically at a selected taxiing speed; so that the system will not indicate smaller percentages of tire deflation, which the aircraft operators may consider not to be hazardous.

While the preferred embodiment of the invention has been illustrated and described, it will be understood by those skilled in the art that changes and modifications may be resorted to without departing from the spirit and scope of the invention.

What is claimed is:

1. An advisory system for detecting and indicating immediately a selected difference in rotational speed of a pair of load bearing wheels of a vehicle comprising first and second signal generating means associated respectively with first and second vehicle wheels, each including wheel speed transducer means coupled to a wheel, for producing a continuous DC voltage wheel speed signal which is proportional in linear relation to the rotational speed of the wheel;

electric comparator means for producing an output signal responsive immediately to a selected difference between two DC voltage input signals applied thereto;

electrically operated fault signaling means responsive to an output signal from said comparator means;

means applying as input signals to said comparator means a first DC voltage wheel speed signal generated by said first signal generating means, and a second DC voltage wheel speed signal generated by said second signal generating means; said comparator means producing an output signal to activate said fault signaling means, when one of said wheel speed signals changes by a selected DC voltage increment relative to the other of said wheel speed signals, said one wheel speed signal functioning as a triggering signal and said other wheel speed signal functioning as a reference signal.

2. An advisory system a set forth in claim 1
each of said wheel speed transducer means comprising an electrically energized magnetic circuit which generates a pulsating voltage signal proportional to wheel speed; and said signal generating means including amplifier means for converting said pulsating voltage signal to a relatively smooth DC voltage signal.

3. An advisory system as set forth in claim 2
said transducer means generating a pulsating signal having a frequency of about 50 cycles per wheel revolution, to enable production of a very smooth DC voltage signal by said amplifier means.

4. An advisory system as set forth in claim 2
each of said amplifier means including an integrating stage; and said integrating stages for both said amplifier means being carried on a common integrated circuit component, to provide for temperature tracking of said two amplifier means.

5. An advisory system as set forth in claim 1
said comparator means producing an output signal to activate said fault signaling means when said triggering wheel speed signal increases a selected amount relative to its respective reference signal, said triggering signal increase resulting from a faster rolling wheel produced by an underinflated tire having a decreased rolling radius.

6. An advisory system as set forth in claim 1
said electric comparator means comprising first and second separate comparator means;
said fault signaling means being responsive to output signals from either of said comparator means;
means applying, as input signals to said first comparator means, said first and second wheel speed signals, with the first wheel speed signal functioning as said triggering signal and the second wheel speed signal functioning as said reference signal;
said first comparator means producing an output signal to activate said fault signaling means when said first wheel speed signal increases a selected amount in relation to said second wheel speed signal;
and means applying, as input signals to said second comparator means, said first and second wheel speed signals, with the first wheel speed signal functioning as said reference signal and the second wheel speed signal functioning as said triggering signal; said second comparator means producing an output signal to activate said fault signaling means when said second wheel speed signal increases a selected amount in relation to said first wheel speed signal.

7. An advisory system as set forth in claim 6
sensitivity resistor means coupling the inputs of said first and second comparator means to said respective reference signal generating means; a source of positive voltage connected to the coupling points of said sensitivity resistor means and respective comparator inputs, and said sensitivity resistor means and said voltage source coacting to produce a positive bias voltage on said reference signal; and said comparator means producing an output signal to activate said fault signaling means when a wheel speed triggering signal goes positive relative to its respective reference signal by the amount of said positive bias voltage.

8. An advisory system as set forth in claim 7
said sensitivity resistor means being readily changeable in said system, to change the positive bias voltage and thereby to change the sensitivity of said system.

9. An advisory system as set forth in claim 6
each of said wheel speed transducer means comprising an electrically energized magnetic circuit which generates a sinuous voltage proportional to wheel speed; and first and second amplifier means coupled to said first and second wheel speed transducer means respectively, for converting said sinuous voltage signal to a relatively smooth DC voltage signal.

10. An advisory system as set forth in claim 6
said vehicle having four wheels including left and right pairs of side-by-side wheels;
said first wheel speed transducer means being associated with one wheel of each of said wheel pairs, and said second wheel speed transducer means being associated with the other wheel of each of said wheel pairs.

11. An advisory system as set forth in claim 6
said vehicle having eight wheels including a plurality of bogies each carrying four wheels; said four wheels of a bogie being arranged in front and rear pairs of side-by-side wheels;
said first and second wheel speed transducer means being associated respectively with diagonally opposite front and rear wheels of one of said bogies.

12. An advisory system as set forth in claim 6
switching means for providing, selectively, energizing voltage for said fault signaling means;
electric comparator means for controlling said switching means;
means applying one of said wheel speed voltage signals as the positive input for said comparator means; means providing a selected positive voltage as the negative input of said comparator means;
said selected negative input voltage for said comparator means being selected to correspond to a wheel speed signal related to a selected vehicle speed, whereby said comparator means will effect the operation of said switching means to remove said energizing voltage for said fault signaling means when said vehicle reaches said selected vehicle speed thereby rendering said system inoperative when said selected vehicle speed is reached.

13. An advisory system a set forth in claim 7
said sensitivity resistor means for each comparator comprising resistor means of different values connected between the respective comparator inputs and the respective wheel speed signal generating means; and switching means for connecting said resistor means alternatively in circuit;
comparator means for controlling said switching means;
means applying one of said wheel speed signals as the input voltage at the negative input of said comparator; and means providing a selected positive voltage to the positive input of said comparator;
said selected voltage applied to the comparator positive input corresponding to a wheel speed signal voltage which relates to a selected speed of said vehicle, whereby said circuit automatically shifts between said sensitivity resistor means of different values at said selected speed of said vehicle.

14. An advisory system as set forth in claim 2
said signal generating means associated with said first wheel comprising a first signal generating channel, and said signal generating means associated with said second wheel comprising a second signal generating channel; said amplifier means for said respective signal generating means including stages for squaring said pulsating voltage signal, for differentiating said squared voltage signal, and for integrating said differentiated signal to produce said relatively smooth DC voltage signal which varies in linear relation with the frequency of said pulsating voltage signal;
said integrating stages for both said channels being carried on a common integrated circuit component.

15. An advisory system as set forth in claim 12
said differentiating stages for both said channels being carried on said common integrated circuit component.

16. An advisory system as set forth in claim 9
said amplifier means including circuit means for amplifying said sinuous voltage signal, circuit means for squaring said amplified sinuous voltage signal; circuit means for differentiating said squared voltage signal; and circuit means for integrating said differentiated voltage signal to produce said relatively smooth DC voltage signal which varies in linear relation with said sinuous voltage signal.

17. An advisory system as set forth in claim 16
said integrating circuit means for both said amplifier means being carried on a common integrated circuit component.

18. An advisory system as set forth in claim 16
said differentiating circuit means and said integrating circuit means for both said amplifier means being carried on a common integrated circuit component.

19. A method for detecting an underinflated load bearing wheel of a vehicle comprising the steps:
producing first and second DC voltage signals proportional in amplitude, respectively, to the changing rotational speeds of first and second vehicle wheels;
feeding said first and second DC voltage signals as two inputs to each of independent first and second comparators;
calibrating each of said comparators to produce an output signal when its first input is more positive than its second input;
feeding said first voltage signal as a triggering input to said first comparator, and as a reference input to said second comparator;
feeding said second voltage signal as a triggering input to said second comparator, and as a reference input to said first comparator;
applying a selected positive bias voltage to each of said reference signals, said bias voltage being the equivalent of a wheel speed voltage signal representing the minimum difference in rotational speed to be detected, whereby a triggering signal must exceed its respective reference signal by the magnitude of said bias voltage to produce said comparator output signal;
detecting output signals from said comparators as indications that one vehicle wheel is rotating faster than the other because of relative underinflation of the one wheel; an output signal from said first comparator indicating an increase in rotational speed of, and underinflation of, said first wheel; and an output signal from said second comparator indicating an increase in rotational speed of, an underinflation of, said second wheel.

20. A method as set forth in claim 19 including the step:
activating a common fault signal with the outputs of both said comparators; said fault signal indicating underinflation of either one of said vehicle wheels.

21. A method as set forth in claim 19 including the steps
producing first and second pulsating voltage signals proportional in frequency, respectively, to the changing rotational speeds of first and second wheels;
and converting said pulsating voltage signals, respectively, to said first and second smooth DC voltage signals which vary linearly with the respective wheel speeds.

* * * * *